(12) United States Patent
Bullister

(10) Patent No.: US 6,587,096 B2
(45) Date of Patent: Jul. 1, 2003

(54) COLLAPSIBLE PORTABLE ELECTRONIC DEVICE WITH DISPLAY

(76) Inventor: Edward T. Bullister, 20 Rolling La., Weston, MA (US) 02493

( * ) Notice: Subject to any disclaimer, the term of this patent is extended or adjusted under 35 U.S.C. 154(b) by 0 days.

(21) Appl. No.: 09/897,559

(22) Filed: Jul. 2, 2001

(65) Prior Publication Data

US 2001/0040559 A1 Nov. 15, 2001

Related U.S. Application Data

(63) Continuation of application No. 08/515,383, filed on Aug. 15, 1995, now Pat. No. 6,256,017, which is a continuation of application No. 08/202,333, filed on Feb. 24, 1994, now abandoned.

(51) Int. Cl.[7] .................................................. G09G 5/00
(52) U.S. Cl. ....................................... 345/168; 345/169
(58) Field of Search .................................. 345/168, 169, 345/156; 400/680, 682, 691, 692, 693; 361/679, 680, 681, 683; 708/140, 141, 142

(56) References Cited

U.S. PATENT DOCUMENTS

| | | | |
|---|---|---|---|
| 3,622,720 A | * 11/1971 | Allen | 200/5 A |
| 3,878,638 A | 4/1975 | Benjamin | |
| 3,940,758 A | 2/1976 | Margolin | |
| 4,939,514 A | 7/1990 | Miyazaki | |
| 5,119,078 A | 6/1992 | Grant | |
| 5,128,662 A | 7/1992 | Failla | |
| 5,187,644 A | 2/1993 | Crisan | |
| 5,267,127 A | 11/1993 | Pollitt | |
| 5,278,779 A | 1/1994 | Conway | |
| 5,410,333 A | 4/1995 | Conway | |
| 5,457,453 A | 10/1995 | Chiu | |
| 6,256,017 B1 | * 7/2001 | Bullister | 345/168 |

* cited by examiner

Primary Examiner—Xiao Wu

(57) ABSTRACT

A collapsible keyboard and display mechanism for a computer system includes a collapsible keyboard having at least two independent keyboard sections and a first hinge device for enabling at least two of the keyboard sections to fold together in face to face relationship; and an independent display section disposed between the two keyboard sections in the collapsed condition.

13 Claims, 5 Drawing Sheets

COLLAPSIBLE PORTABLE ELECTRONIC DEVICE WITH DISPLAY

This is a continuation of Ser. No. 08/515,383 filed Aug. 15, 1995, now U.S. Pat. No. 6,256,017 continuation of Ser. No. 08/202,333 filed Feb. 24, 1994 now abandoned. The applicant claims priority under USC 120 to both earlier applications.

FIELD OF INVENTION

This invention relates to a collapsible keyboard and display mechanism for a computer system, and more particularly to such a mechanism which protects and cushions even an exposed, unguarded display.

BACKGROUND OF INVENTION

Portable computers offer many great advantages to the user. A single portable computer can be used in place of several stationary computers in the home, office, and elsewhere. Data and computing power can easily be transported on the road or to a remote site. The problem of inconsistent data on remote unconnected computers can usually be avoided. The utility of these devices depends on the degree to which they are portable (their size and weight), on the degree with which they can reproduce the ergonomics of a full-sized computer, and on their durability. Early "credit-card" calculators were not durable. They were typically held in a wallet in the back pants pocket. The user sitting down invariably bent the card sufficiently to break the fragile and brittle display. Current laptop computers protect the fragile display with thick and heavy plastic "armor". This adds weight and size and therefore reduces portability. Current laptop computer design generally represents a compromise between the size as measured by the "footprint" of the folded device and the ergonomics. They are designed around the ergonomic constraint that the keyboard width should be roughly the width of two human hands (about ten inches).

Numerous patents have been awarded for the introduction and refinement of the folding display and keyboard (Lai-Fa Hsieh, Great Electronics Corporation, U.S. Pat. No. 4,926,365; Takashi Hosoi, Toshiba, U.S. Pat. No. 5,052,078, etc.). A recent article in the January 1994 issue of PC Laptop provides a detailed and comprehensive review of 86 handheld, pen-based, notebook, and laptop computing devices. Essentially all of the devices which use a keyboard have the display fold into the keyboard.

In these current designs, the footprint is constrained to be as large as the larger of the two components. Moreover, the keyboard has an aspect ratio of roughly two-to-one, whereas the standard displays have an aspect ratio close to unity; 640×480, 1280×1024 pixels are common values. The result of this inconsistency is wasted footprint area.

Laptop makers have gone to great lengths to work around this constraint. One design compresses the aspect ratio of the pixels so that each pixel is rectangular rather than square. This allows standard display resolutions to be displayed in elongated displays. However, the resultant images are distorted. Circular pie charts become elliptical.

An alternative design is incorporated into current sub-notebooks and personal organizers. This design simply shrinks the keyboard substantially below the size that is ergonomically comfortable. Typically the overly packed keys must be curved in a convex manner to prevent inadvertent actuation of adjacent keys. These have been derisively termed "chicklets keyboards" by reviewers.

Personal information managers solve the problem by declaring that the keyboard is unnecessary and by promising useable voice and handwriting recognition capability sometime in the future.

One attempt to solve some of these problems uses hinged keyboards. See U.S. Pat. Nos. 3,940,758; 4,395,704; 4,517,660; 4,939,514. But these approaches all suffer their own shortcomings: the hinges protrude and interfere with the use of the keyboard; the display must be guarded and protected so it is unduly large and is generally fixed to the keyboard or other structure and does not collapse.

SUMMARY OF INVENTION

It is therefore an object of this invention to provide an improved collapsible keyboard and display mechanism for a computer system.

It is a further object of this invention to provide such an improved collapsible keyboard and display mechanism which protects the display within the collapsed keyboard.

It is a further object of this invention to provide such an improved collapsible keyboard and display mechanism which enables use of a smaller, lighter display using an exposed, unguarded display element.

It is a further object of this invention to provide such an improved collapsible keyboard and display mechanism in which the keys act as a cushioning element to further protect the display.

It is a further object of this invention to provide such an improved collapsible keyboard and display mechanism which can employ a conventional alphanumeric keyboard.

It is a further object of this invention to provide such an improved collapsible keyboard and display mechanism which the keyboard and display have the same aspect ratio in the collapsed state so that the package is very efficient in its use of space.

It is a further object of this invention to provide such an improved collapsible keyboard and display mechanism which the light weight display is easily positioned for optimum viewing comfort.

It is a further object of this invention to provide such an improved collapsible keyboard and display mechanism in which a truly "shirt pocket" package can be obtained.

The invention results from the realization that a truly compact, efficient, "shirt pocket" computer can be achieved with a hinged keyboard having two or more sections which fold together about an independent display to protect the display and cushion it with the keys themselves so the display can be little more than a bare display element exposed and unguarded but for the protection afforded by the keyboard, and further that through the use of link hinges any interference of the hinges with the use of the keyboard can be virtually eliminated, and that also through the use of link hinges a two section display and two section keyboard can be made to compactly collapse by making coincident the axes of rotation of the display hinges and the keyboard hinges.

This invention features a collapsible keyboard and display mechanism for a computer system. There is a collapsible keyboard having at least two independent keyboard sections and first hinge means for enabling at least two of the keyboard sections to fold together in face to face relationship. An independent display section is disposed between the two keyboard sections in the collapsed condition.

In a preferred embodiment the first hinge means may include a link hinge means. The link hinge means may orient the two keyboard sections in a spaced relationship in the collapsed condition and the two keyboard sections may be substantially parallel in the collapsed condition. The keyboard sections may have their keys facing toward each other in the collapsed face to face relationship. The display section may be interconnected with the keyboard by second hinge means. The second hinge means may have its axis transverse to the first hinge means. The second hinge means may be on the back of the keyboard. The display section may include an exposed display element. At least two of they keyboard sections include alphabet keys. The display section may be interconnected with the keyboard by a mechanical linkage for adjusting the position of the display section relative to the keyboard and the user. The display section may include first and second display segments and third hinge means for collapsibly interconnecting the segments with each other. The second hinge means may include a first hinge device for interconnecting one of the display segments with one of the keyboard sections and a second hinge device for interconnecting the other of the display segments with another of the keyboard sections. The axis of rotation of the first hinge means and the third hinge means may coincide for enabling the display segments to collapse in face to face relationship and fold within the collapsed keyboard sections. At least one of the keys on the keyboard may include a recess for accommodating at least a portion of the first hinge means. The first, second and third hinge means may have mutually perpendicular axes.

DISCLOSURE OF PREFERRED EMBODIMENT

Other objects, features and advantages will occur to those skilled in the art from the following description of a preferred embodiment and the accompanying drawings, in which.

Figure 1:
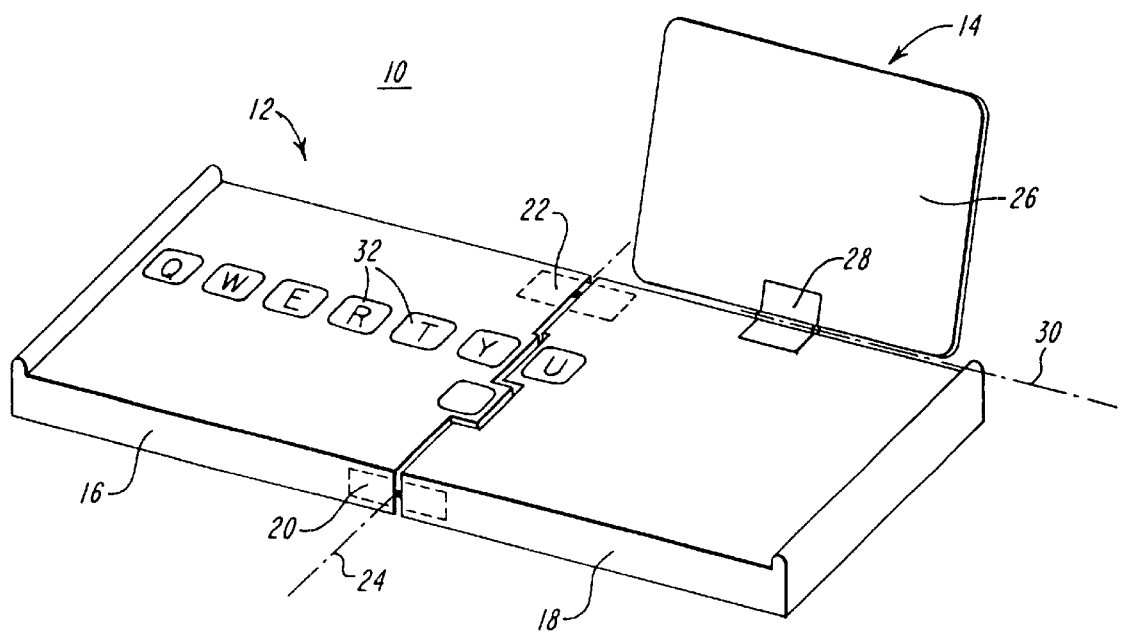
FIG. 1 is a three-dimensional diagrammatic view of a collapsible keyboard and display mechanism for a computer system according to this invention in the opened position.

This invention may be accomplished in a collapsible keyboard and display mechanism for a computer system. There is a collapsible keyboard of a conventional type, also known as a "QWERTY", which includes a central section containing a contiguous array of the alphabetic keys and numeric character keys. The keyboard includes at least two keyboard sections and a hinge for enabling the two of them to fold together in face to face relationship. There is an independent display section which is disposed between the two keyboard sections in the collapsed condition, This display may be connected to the keyboard by a hinge or some other mechanism, or it may be mechanically separate although still electrically connected to the keyboard and the computer therein. In any case, the display section is an independent section from the keyboard sections. Further, it is typically formed from an exposed or unguarded display element which is structurally self-supporting. That is, in conventional laptop computers and other portable computers, the display element, being a fragile material, is housed and guarded in a strong, resilient protective housing to prevent harm to the display element.

According to this invention, the display element can be unguarded and exposed because it is stored in the collapsed condition between two keyboard sections which form a similarly strong resilient and guarded protective housing to protect the display element. Further, if the keyboard sections are arranged so that the keys face each other in the collapsed condition the resilience of the keys themselves act as a cushion to further protect the display element and keep it from harm.

The two keyboard sections are connected together by some hinge means, preferably a link hinge such as a Soss hinge. A link hinge is a hinging mechanism which incorporates multiple links that move relative to the hinged components. Soss is the name of the inventor of the link hinge fully disclosed in U.S. Pat. No. 1,484,093 in his name. Such hinges have an axis of rotation which is outside the hinge itself and permits parts to be swung about parallel and in juxtaposition in a well-known manner. The link hinge orients the keyboard sections so as to maintain a substantially parallel spaced relationship between them in the collapsed condition even when the display element is disposed between the keyboard sections. Typically, when the display is attached to the keyboard by a hinge, the axis of the display section hinge is transverse to the axes of the keyboard section hinge. In fact, they are ordinarily perpendicular. Usually the display section is hinged or disposed at the back of the keyboard when the mechanism is opened or unfolded. The display section may be interconnected with the keyboard by a pivot arm, scissor, pantograph or other parallelogram type linkages or other mechanism to allow it to be repositioned for the convenience of the user to be moved about, raised and lowered, shifted left and right with respect to the keyboard, and generally permit the user to place it in any convenient location for viewing.

The display section may include two display segments which are hinged to each other as well as to the keyboard. The hinge which connects them to each other would have an axis that (in the open condition) is mutually perpendicular with the hinges that connect the display segments to the keyboard and the hinges that connect the keyboard sections to each other, so that in the open condition the noncoincidence of the various axes make for a stable structure. However, when the two display sections are folded down against the keyboard sections the hinges interconnect the display segments have their axis coincident with the axis of the Soss hinges that interconnect the keyboard sections so that the entire assembly can then be folded one more time to completely enfold the display segments within the collapsed folded keyboard sections.

Figure 2:
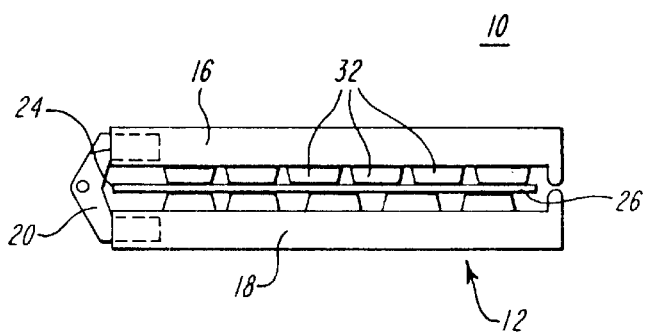
FIG. 2 is a side elevational view of the collapsible keyboard and display mechanism for a computer system of FIG. 1 in the collapsed condition.

There is shown in FIG. 1 a collapsible keyboard and display mechanism 10 for a computer system in accordance with this invention including a keyboard 12 and a display section 14. Keyboard 12 includes in this embodiment only two keyboard sections 16 and 18 which contain the conventional QWERTY alphanumeric keyboard as universally used on typewriters, computers and similar equipment. Keyboard sections 16 and 18 are interconnected by a pair of link hinges 20 and 22 which have their axis of rotation 24 slightly above the top of keyboard sections 16 and 18. Display section 14 consists of a simple display element 26 without protective housing or shields such as a basic LCD device, and is interconnected with keyboard 12 by means of a conventional hinge 28 interconnected between element 26 and keyboard section 18. The axis of rotation of hinge 28, 30 is perpendicular to axis of rotation 24 of hinges 20 and 22. Keys 32 on keyboard 12 are conventional touch keys which have a measure of resilience springiness to provide tactile feedback to the user in the normal way. In the collapsed condition, mechanism 10, FIG. 2, provides protection for display element 26 first by means of the solid structural nature of keyboard sections 16 and 18, and second by the resilience of keys 32 which cushion sections 16 and 18 against shocks, jolts, and bending of keyboard components 16 and 18. Display element 26 is essentially the same length and width and generally of the same area as each of keyboard sections 16 and 18. Thus the footprint of all three sections is the same, making the packaging an efficient use of space which provides full benefit of size of both the display element 26 and the keyboard sections 16 and 18. In all of these embodiments, above and following, it will be appreciated that the battery, CPU, I/O and memory and mass storage devices will be included as usual in keyboard 12.

Figure 3:
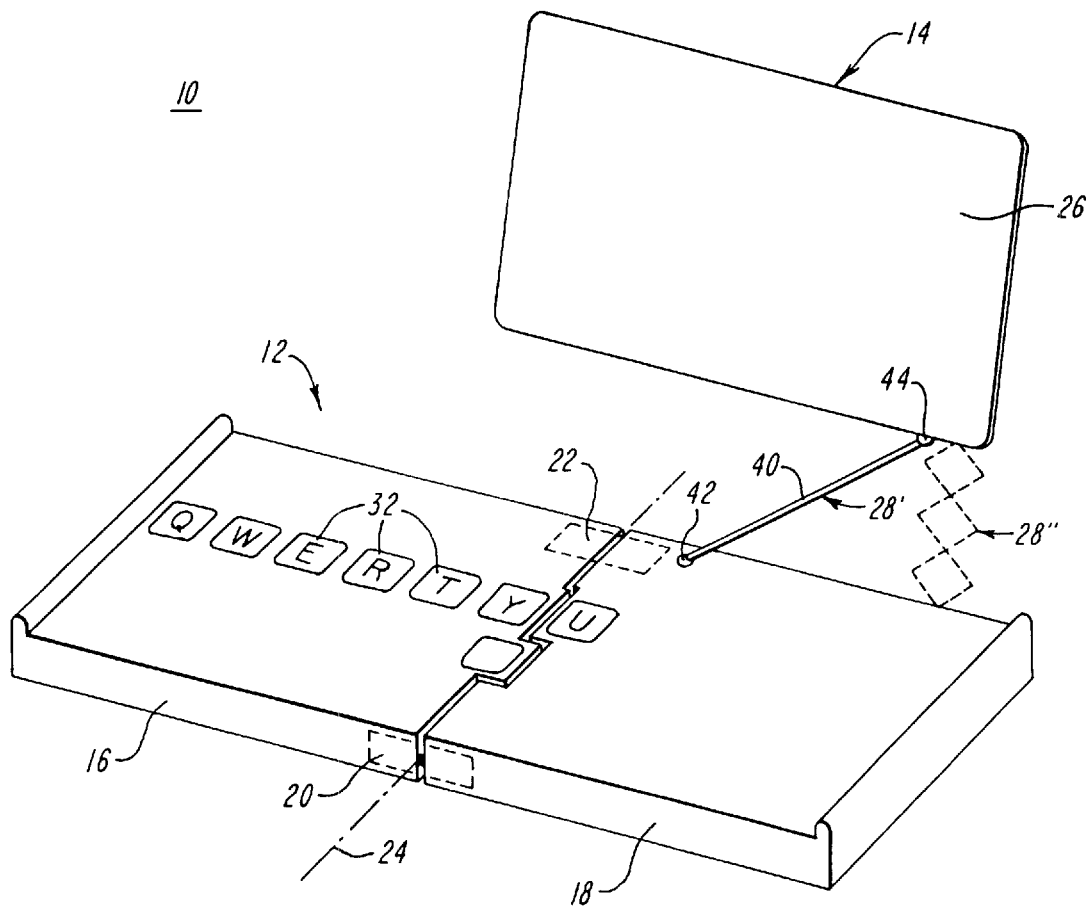
FIG. 3 is a view similar to FIG. 1 illustrating a mechanical linkage for adjusting the position of the display section relative to the keyboard and the user.

Throughout this description of the invention like parts have been given like numbers and similar parts have been given like numbers accompanied by a prime designation or a lower case letter. Although display element 26 in FIG. 1 is shown physically interconnected by means of hinge 28 to keyboard 12, this is not a necessary limitation of the invention. Instead of pivot arm 28', any other suitable mechanism may be used, for example scissor 28" or a pantograph or other parallelogram type structure. For example, as shown in FIG. 3, display element 26 can be interconnected by means of pivot arm 28' which includes rod 40 with a ball joint 42, 44 on either end so that display element 26 can be moved about, raised and lowered, and shifted closer and farther away for the convenience of the user.

Figure 4:
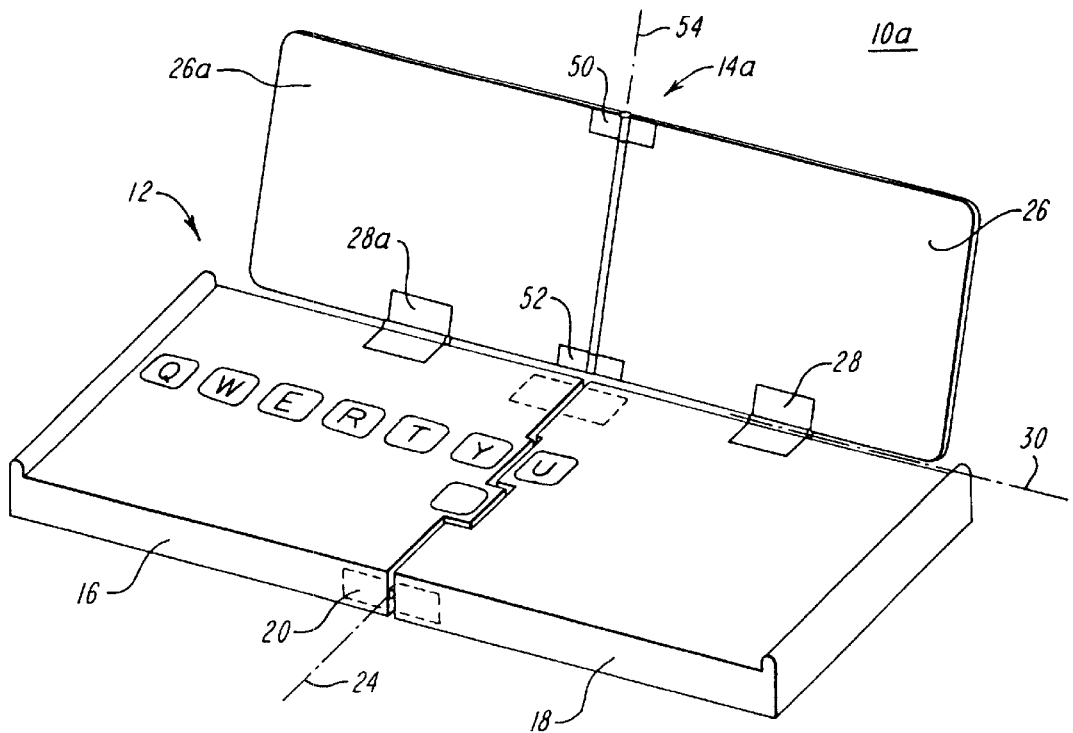
FIG. 4 is a view similar to FIG. 1 wherein the display section includes two display segments.

In another construction, collapsible keyboard and display mechanism 10a, FIG. 4, may have a display section 14 consisting of two display segments 26 and 26a interconnected by conventional hinges 50, 52 having a rotational axis 54, and interconnected to keyboard 12 only by means of hinge 28 or by hinge 28 and a second hinge 28a.

Figure 5:
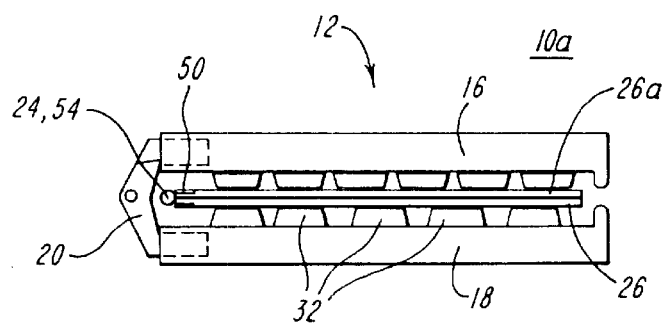
FIG. 5 is a side elevational view of the collapsible keyboard and display mechanism for a computer system of FIG. 4 in the collapsed condition.

In the open condition, as shown in FIG. 4, mechanism 10a provides a stable structure because the axes 24, 30 and 54 of hinges 20, 22; 28, 28a; and 50, 52 are mutually perpendicular. However, when display segments 26 and 26a are rotated downwardly against keys 32 on keyboard sections 16 and 18 about axis 30 of hinges 28 and 28a, the axes 54 of hinges 50 and 52 coincide with the axis 24 of hinges 20 and 22. While axis 54 is at the center of the rotation pin of conventional hinges 50 and 52, the rotational axis 24 of Soss hinge 20, 22 is spaced somewhat above hinges 20 and 22, allowing for this coincidence. This enables the second folding to be facilitated so that the two display sections 26 and 26a are safely enfolded within keyboard sections 16 and 18 as shown in FIG. 5.

Figure 6:
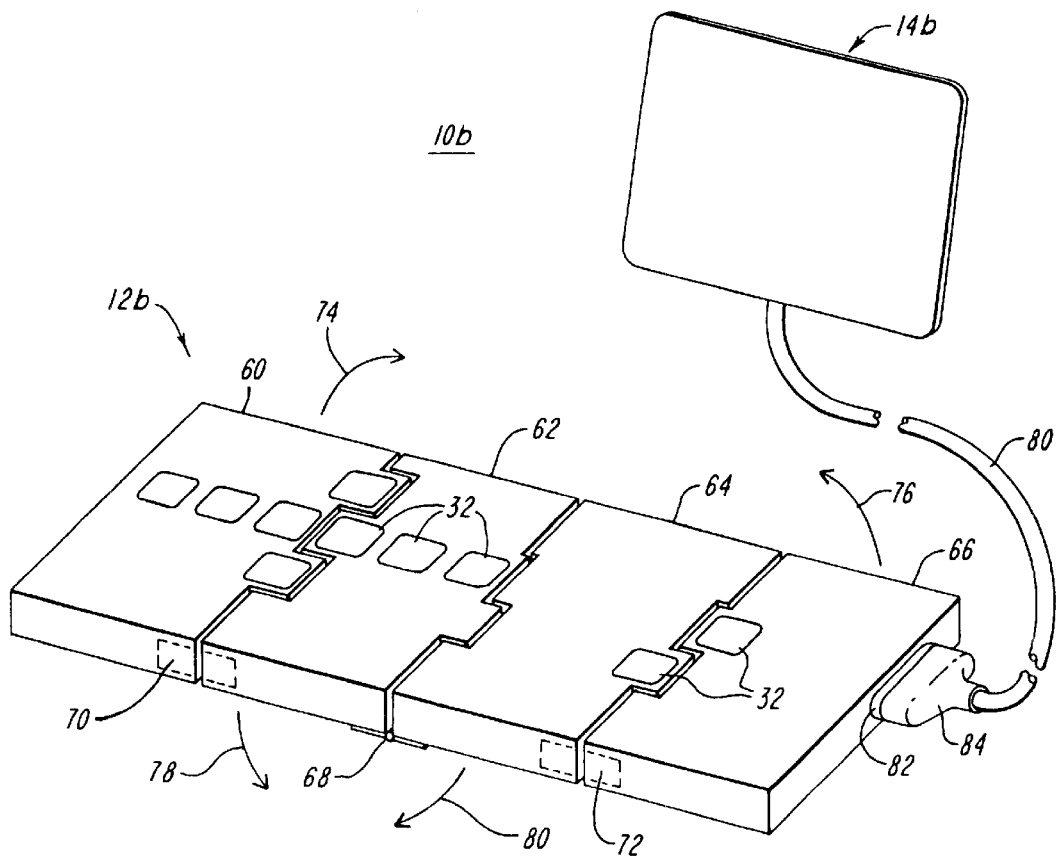
FIG. 6 is a view similar to FIG. 1 showing the keyboard having four keyboard sections and the display section connected not mechanically but only electrically to the keyboard.
Figure 7:
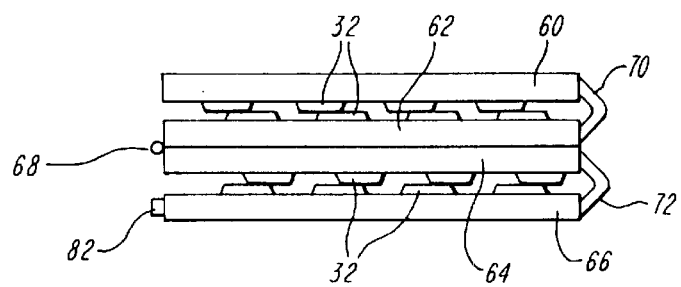
FIG. 7 is a side elevational view of the collapsible keyboard and display mechanism for a computer system of FIG. 6 in the collapsed condition.
Figure 8:
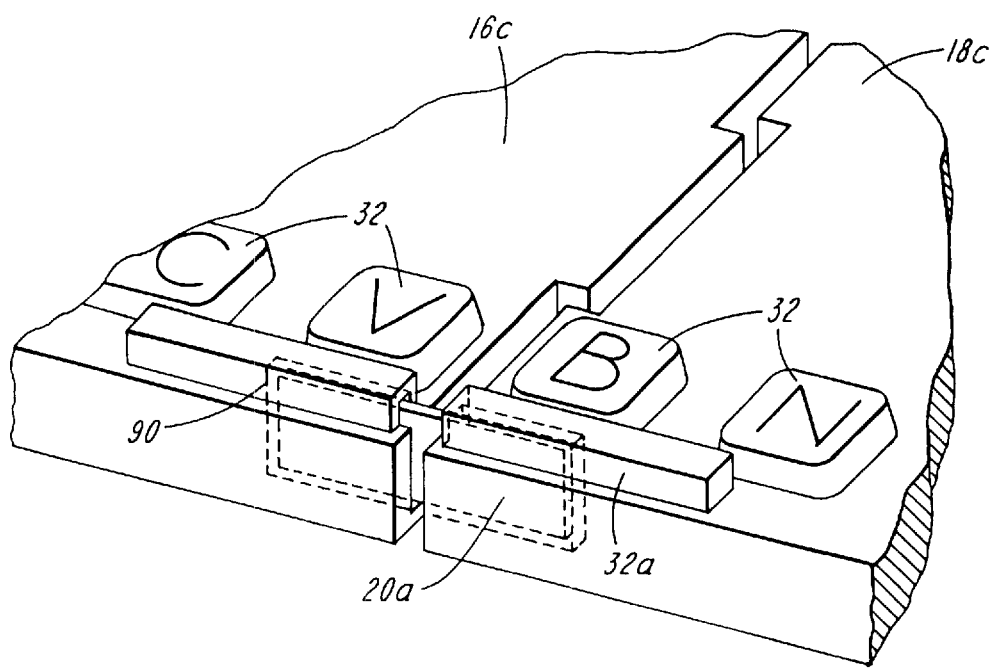
FIG. 8 is an enlarged detail view of a portion of a keyboard according to this invention showing a recess in a key for accommodating a portion of the hinge interconnecting the keyboard sections.

Keyboard 12b, FIG. 6, includes four keyboard sections 60, 62, 64 and 66. Sections 62 and 64 are hingeably interconnected by conventional hinges, only one of which, 68, is visible. Sections 60 and 62, however, are interconnected by link hinges only one of which, 70, is shown. Sections 64 and 66 are also connected by link hinges, only one of which, 72, is shown. Also in FIG. 6, display 14b is shown without mechanical interconnection to keyboard 12b. It is only interconnected by, detachable electrical cable 80 via display data communications port 82 and connector 84. Mechanism 10b, FIG. 6, is collapsed by first rotating sections 60 and 66 inwardly toward each other as indicated by arrows 74 and 76, respectively, and then swinging sections 62 and 64 along with sections 60 and 66, respectively, about hinge 68 in the direction indicated by arrows 78 and 80. This results in the arrangement as shown in FIG. 7, with electrical cable 80 and display section 14b no longer attached to keyboard 12b and stored elsewhere. The use of the link hinge insures that the hinge arrangement will not interfere with the use of the keys and keyboard. This can be insured even further, and especially so if conventional as opposed to link hinges are used, by hollowing out selected keys on the keyboard to provide a recess to accommodate any protruding portions of the hinge. This is shown in FIG. 8, where spacer bar 32a which bridges keyboard sections 16c and 18c contains a recess 90 which accommodates a portion of hinge 20a.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A portable electronic device adapted to be easily collapsible for storage and protection, comprising:
    a) a portable electronic processing device, said portable electronic processing device comprising a first housing section and a second housing section,
    b) a display comprising a first display section and a second display section,
    c) a first hinge connecting said first housing section to said second housing section and facilitating the folding of said first and second housing sections about a first axis,
    d) a second hinge connecting said first housing section to said first display section, and facilitating the folding of said first housing section and said first display section about a second axis,
    e) a third hinge connecting said first display section to said second display section, and facilitating the folding of said first display section and said second display section about a third axis.

2. The portable electronic device of claim 1, wherein said first and second housing sections are collapsible from a substantially coplanar relationship to a face-to-face relationship.

3. The portable electronic device of claim 1, wherein said first and second display sections are collapsible from a substantially coplanar relationship to a face-to-face relationship.

4. The portable electronic device of claim 1, wherein:
    a) said first and second housing sections are collapsible from a substantially coplanar relationship to a face-to-face relationship,
    b) said first and second display sections are collapsible from a substantially coplanar relationship to a face-to-face relationship,
    c) said first and second display sections are sandwiched between said first and second housing sections in a collapsed condition.

5. The portable electronic device of claim 1 wherein said first and second housing sections comprise one or more keys.

6. The portable electronic device of claim 5, wherein said first and second housing sections in said open condition comprise a keyboard.

7. The portable electronic device of claim 1, wherein said first and second axes are at a fixed angle with respect to each other.

8. The portable electronic device of claim 7 wherein said fixed angle is approximately 90 degrees.

9. The portable electronic device of claim 1, wherein said first hinge is a link hinge.

10. The portable electronic device of claim 1, further comprising a fourth hinge connecting said second housing section with said second display section.

11. A portable electronic device adapted to be easily collapsible for storage and protection, comprising:
   a) a portable electronic processing device, said portable electronic processing device comprising a first housing section and a second housing section, and
   b) a display comprising a first display section and a second display section, wherein:
   i. said first and second housing sections are collapsible from a substantially coplanar relationship to a face-to-face relationship,
   ii. said first and second display sections are collapsible from a substantially coplanar relationship to a face-to-face relationship, and
   iii. said first and second display sections are sandwiched between said first and second housing sections in said collapsed condition.

12. The portable electronic device of claim 11, wherein said first and second housing sections comprise one or more keys.

13. The portable electronic device of claim 11, wherein said first and second housing sections in said open condition comprise a keyboard.

\* \* \* \* \*